(12) United States Patent
Selvaraj et al.

(10) Patent No.: US 11,162,824 B2
(45) Date of Patent: Nov. 2, 2021

(54) SYSTEM AND METHOD OF SCREENING BIOSENSORS

(71) Applicant: Vital Connect, Inc., San Jose, CA (US)

(72) Inventors: Nandakumar Selvaraj, San Jose, CA (US); Anuj Sareen, San Jose, CA (US); Zachary Bernal, San Jose, CA (US); Ashwin Upadhya, San Jose, CA (US)

(73) Assignee: Vital Connect, Inc., San Jose, CA (US)

( * ) Notice: Subject to any disclaimer, the term of this patent is extended or adjusted under 35 U.S.C. 154(b) by 357 days.

(21) Appl. No.: 16/256,159

(22) Filed: Jan. 24, 2019

(65) Prior Publication Data

US 2020/0240818 A1 Jul. 30, 2020

(51) Int. Cl.
*G06F 11/30* (2006.01)
*G01D 18/00* (2006.01)

(52) U.S. Cl.
CPC .................................. *G01D 18/00* (2013.01)

(58) Field of Classification Search
CPC ...................................................... G01D 18/00
See application file for complete search history.

(56) References Cited

U.S. PATENT DOCUMENTS

2015/0020571 A1* 1/2015 Chan ........................ G01P 21/00
73/1.38

* cited by examiner

*Primary Examiner* — Phuong Huynh
(74) *Attorney, Agent, or Firm* — Brundidge & Stanger, P.C.

(57) ABSTRACT

A biosensor screening system and method is disclosed that assesses functional integrity/capacity of biosensor samples and identifies the biosensor samples that may potentially cause failure such as shutdown of biosensor during normal use. Features of the disclosed biosensor screening system and method may include connecting to a biosensor to a biosensor screening test apparatus, conducting a biosensor screening test using the biosensor screening apparatus on the biosensor connected to the biosensor screening test apparatus, collecting data attributes from the biosensor after completing the biosensor test, scaling the collected data attributes, and obtaining a screening test score.

18 Claims, 7 Drawing Sheets

SYSTEM AND METHOD OF SCREENING BIOSENSORS

TECHNICAL FIELD

Described and recited herein are examples, embodiments and/or iterations of a system and method for screening biosensors.

BACKGROUND

Traditionally, quality assurance assessments commonly inspect various system components and processes during manufacturing. However, functional integrity of a device, such as a biosensor, after usually long manufacturing process may not fully be known at the time of the quality assurance assessment. Furthermore, the functional integrity of manufactured biosensors or failure assessments is usually learned by deployment of the devices in the field and reported back with observations/complaints. The downside of this conventional approach is that a small probability of failure of biosensor in the field may downgrade the reliability of sensors particularly in critical fields such as patient monitoring in hospital environments.

Thus, a novel approach is necessitated to identify the potential biosensors that may cause deviations or failures in the intended use case without requiring field deployment.

SUMMARY

The following description discloses a system and a method to identify potential biosensors that may cause deviations or failures of the device by learning data attributes measured during a screening test and identifying devices that possess unique characteristics and an associated probability for performance deviations, include complete device failure, without requiring field deployment. The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION OF PREFERRED EMBODIMENTS

Figure 1:
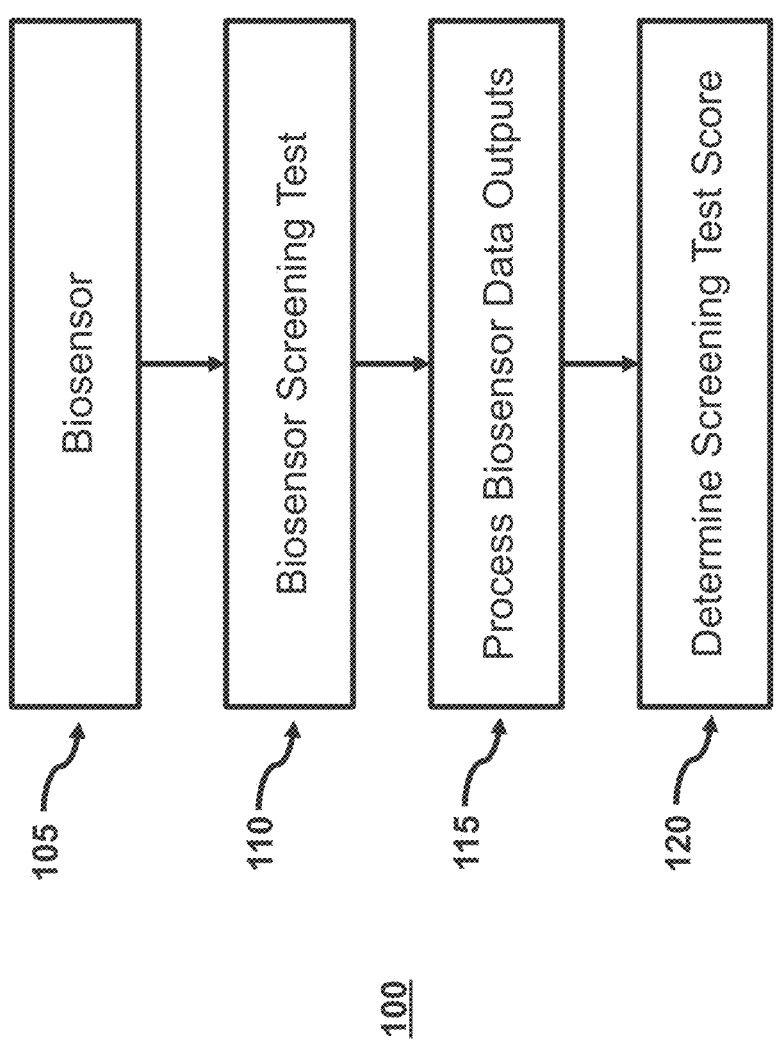
FIG. 1 shows a depiction of an aspect of a biosensor screening system and method, in accordance with example embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Described herein are embodiments of a system and a method that identifies potential biosensors that may cause deviations or failures of the device by learning data attributes measured during a screening test and identifying devices that possess unique characteristics and an associated probability for performance deviations, include complete device failure, without requiring field deployment. The description that follows is intended to enable one of ordinary skill in the art to make and use one or more of the embodiments. Various modifications will be readily apparent to those skilled in the art. Thus, the description is not intended to be so inclusive as to be limited to the described embodiments, but is to be accorded the widest scope consistent with the principles and features described herein.

As used in the description below, a wearable medical sensor device may also be referred to, as an example only, a health monitoring sensor device. Examples of such may include a reusable module and a disposable module that each decouple from each other and each comprise varying components to efficiently and continuously monitor a user's health and/or physiological data or, alternatively, administer health-related products or stimulation to the user, e.g., insulin, heat, massage, etc.

Biosensors, wearable medical sensors, and other biomedical devices play a critical role in diagnosing and monitoring a patient's health. For example, utilizing wearable medical sensors, a user's physiological data may be collected so that the user's health may be evaluated or, alternatively, apply medicine or stimulation. As an example, such sensors may be utilized to measure patient's vital signs continuously or an athlete's fitness performance during training or actual competition. The data collected by sensors may include, but not be limited to, electrocardiogram, photoplethysmogram, phonocardiogram, accelerometer, heart rate, breathing patterns, activity levels, body temperature, etc., under certain conditions and/or over an extended period of time. For both the medical patient and the athlete, which are non-limiting examples for whom usage of the embodiments described herein applies, it may be expected that one or more medical sensors are worn, i.e., adhered to the individual's epidermis layer, for an extended period of time and/or under conditions that are not always compatible with long-term adhesion.

For example, for the sake of accuracy, a patient being observed for cardio-related issues may be required to wear one or more heart monitors for days or weeks or even months on end; or sleep study subjects may be required to wear one or more biosensors for days or weeks without removing the sensor(s); etc. As another example, an athlete in training may be subjected to physiological testing or monitoring that requires the athlete to wear one or more medical sensor devices while training or performing. In both scenarios referenced above, as well as others not explicitly described herein, the biosensor electrical or optical or acoustic components such as battery, sensing pads, electrical contacts and algorithmic processes applied to sensor measurements are intended to be fully functional during the wearable duration of medical sensor device adhered to the subject's skin, i.e., epidermis layer without any sensor shutdown or malfunction or failure to sensing due to various factors including time varying demands of electrical currents for sensor operations and communication protocols. In contrast, unintentional deviations or failures of the sensor device during physiological monitoring is undesirable.

The following description describes a system and method that assesses functional integrity/capacity of such biosensor samples (e.g., VitalPatch® by Vital Connect, Inc.) including battery's health and performance, and identify the biosensor samples that may potentially cause failure such as shutdown of biosensor during normal use. Moreover, the samples identified with high probability for failure can be withheld from the field deployment and can be repurposed for research and other applications.

Figure 3:
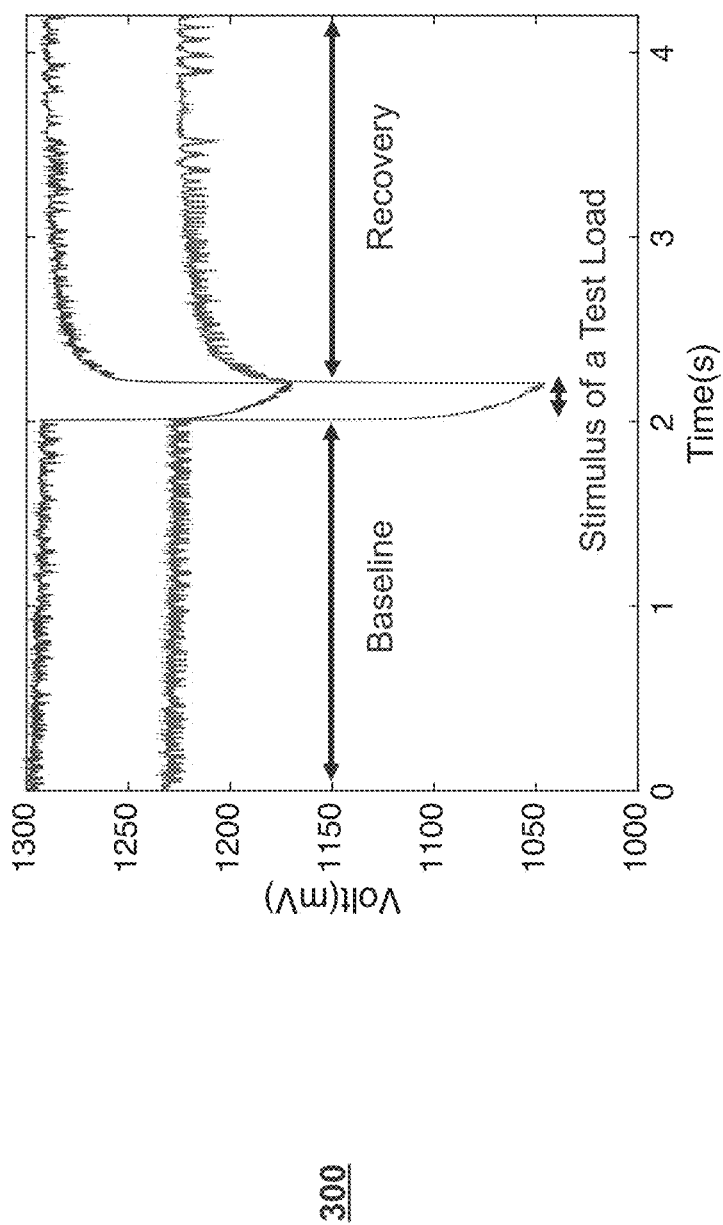
FIG. 3 is a depiction of sample biosensor data outputs from the biosensor screening test, in accordance with example embodiments described herein.
Figure 4:
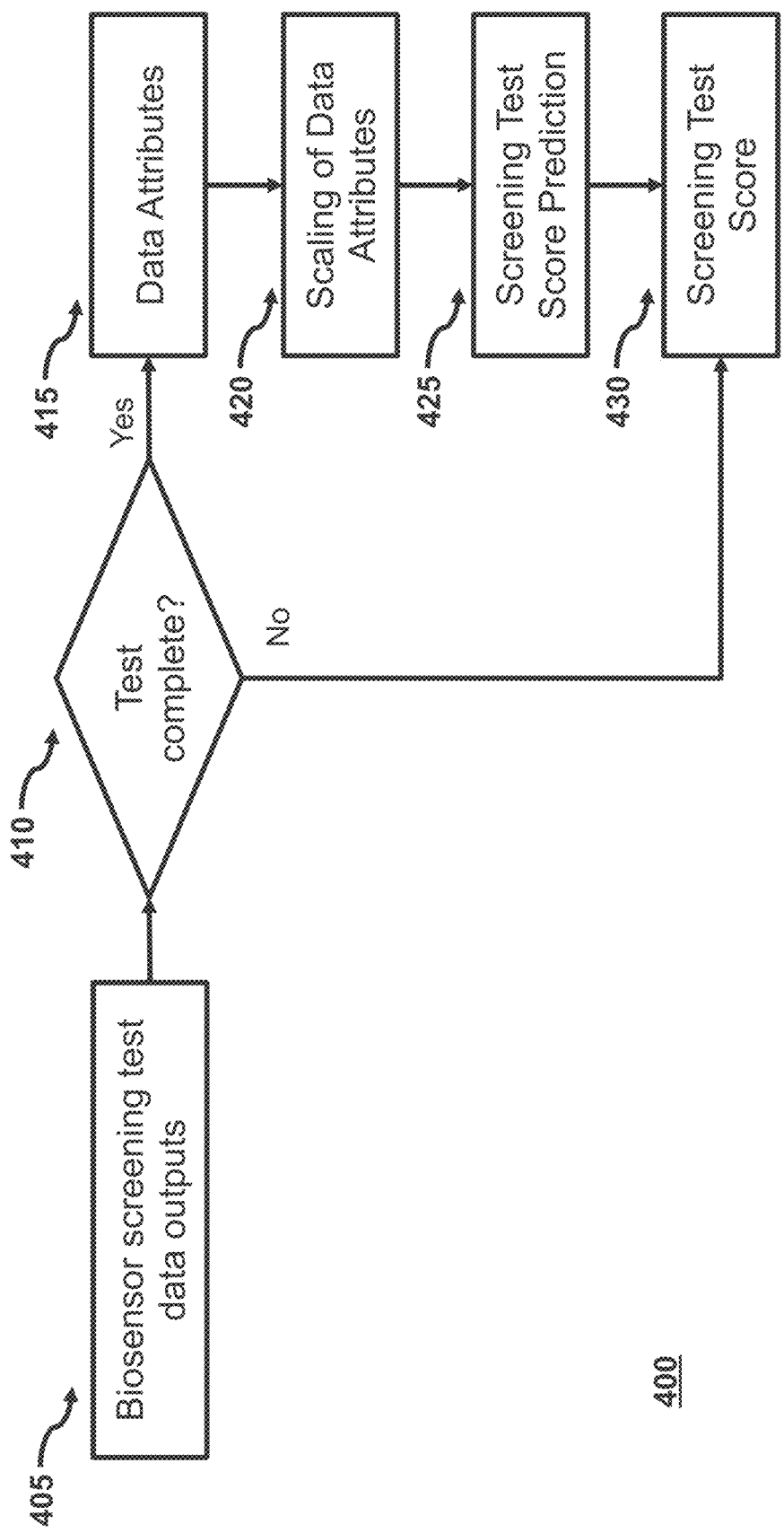
FIG. 4 is a depiction of determining screening test score, in accordance with examples and embodiments described herein.

FIG. 1 shows a depiction of an aspect of a biosensor screening system and method, in accordance with example embodiments described herein. As depicted, biosensor screening system and method 100 includes, at least, biosensor 105, biosensor screening test 110, process Biosensor data outputs 115 and determine biosensor screening test score 120. The biosensor 105 may be any of the forms of an adhesive based patch biosensor, or a wearable electronic device of various form factors, including watch, band, pendent, ring and others, worn on parts of human body such as chest, wrist, finger, forehead, neck and other places. The biosensor is subjected to a biosensor screening test as described in detail at FIG. 2 and method 200 below. The biosensor produces various forms of data outputs during biosensor screening test that includes electrical (e.g., voltage, current, impedance, resistance, reactance, conductance) or optical (e.g., reflectivity, attenuation, absorbance light intensity) or mechanical (e.g., force, strain, acceleration) characteristic measurements. In one example, biosensor data output in terms of electrical voltage, as described in FIGS. 3 and 300, are processed to derive data attributes that are input to determine biosensor screening test score as detailed in FIG. 4 and method 400.

Method 200 (FIG. 2) is a depiction of an aspect of a biosensor screening test 110, in accordance with example embodiments described herein. As depicted, biosensor screening test 200 includes, at least, Power on 205, Programming of test firmware 210, Reboot from the test firmware image 215, Enable test mode operation 220, Baseline load for a predetermined duration 225, Test load for a predetermined duration 230, Recovery load for a predetermined duration 235, Complete data collection 240, Disable test mode operation 245, and Restore regular firmware 250.

Figure 2:
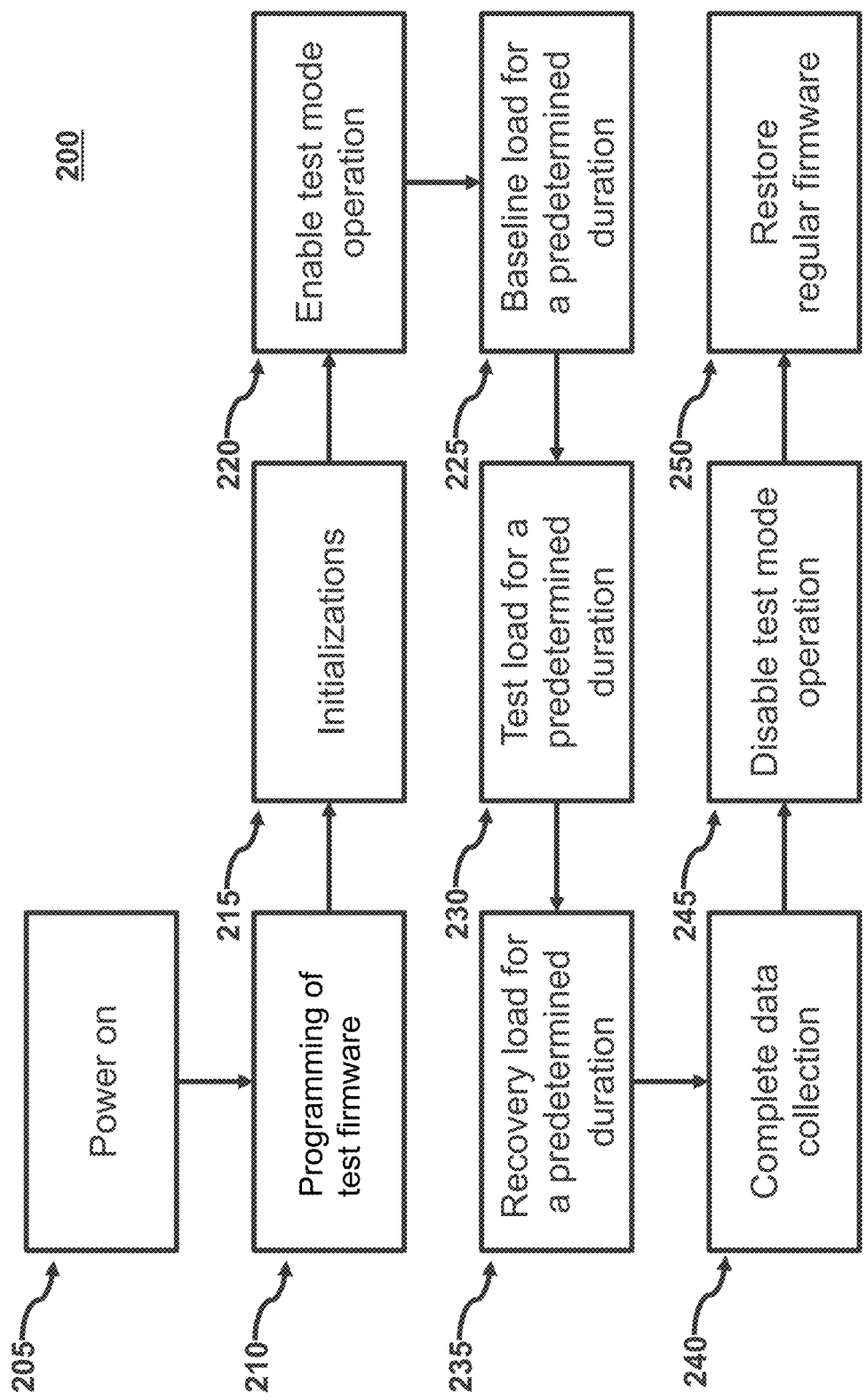
FIG. 2 is a depiction of an aspect of a biosensor screening test, in accordance with example embodiments described herein.

As shown in FIG. 2, biosensor screening test 200 subjects a biosensor (105, as shown in FIG. 1) through a sequence of consistent and deterministic controlled operations. Accordingly, first the biosensor power is turned on 105 by manually pressing the power on button on the sensor surface that allows sensor to boot from regular firmware. Screening test firmware is programmed on to the Biosensor's flash memory over-the-air using Bluetooth low energy (BLE) wireless protocol, in one example, per Programming of test firmware 210. The programming can also be done using other wired or wireless protocols, such as UART, SPI, Ethernet, WiFi, etc. The programming of test firmware image overwrites a backup copy of the main firmware image, and leaves the original firmware image intact, so that it may be restored later upon completion of the screening test. The screening test firmware can also be programmed on to the Biosensor's random-access memory (RAM) using joint test action group (JTAG). The programming of test firmware image should be done such that the main firmware image is left intact so that it may be restored later upon completion of the screening test. Thus, the test firmware image is programmed on a backup copy of the main firmware image, or on the RAM, and leave the original firmware image intact.

Upon completion of the programming, the controller is forced to reboot and the screening test firmware image is executed. Several initializations of the original firmware of the biosensor are removed from the screening test firmware image that disables normal mode of biosensor operation and further certain tasks including image back up, calibration and computational algorithms are disabled, per Initializations 215. Furthermore, data buffers are initialized to store the data samples that will be generated during the screening test. Upon completion of initializations, the test mode firmware initiates data sampling including voltages at a desired sampling rate such as every 2 ms by the biosensor processor, per 220, to be stored in an internal memory device or transmit to an external relay device. Now the biosensor screening test is started. It involves applying a desired load current for a predetermined duration, per 225 in FIG. 2, as a baseline period. In one example, the baseline load current is an average load current for the biosensor normal operation. After the baseline measurement, one or more stimuli of test load current are applied for a predetermined duration per 230 in FIG. 2. In one example, the test load current is few times higher than the baseline load or the previously observed peak draw currents of biosensor at peak operation (or overload operation). Test load is followed by a recovery test period where a desired load current similar to baseline load is applied for a predetermined duration, per 235 in FIG. 2. According to certain examples described herein, the predetermined durations associated with Baseline load at 225, Test load at 230 and Recovery load at 235 are independently set. Accordingly, such predetermined durations may be equal in duration or differ in duration. The test load current stimulus is provided by the firmware by rebooting the Bluetooth chipset in test mode operation, per 220. In this test mode, the Bluetooth carrier wave is enabled and this provides the required current load for a required duration and then stopped after the required duration. Other means of providing test load may include turning on/off the LED, performing flash write/erase operations. In another example, applying the Test load for a predetermined duration, 230, may be repeated two or more times with varying predetermined time intervals, before applying Recovery load for a predetermined duration, 235. This approach may simulate applying a dynamic current loading to the performance of the biosensor.

According to certain examples described herein, after the recovery measurement, the data collection 240 including the voltage output measurements of the biosensor components is complete. If the raw biosensor measurements are saved in a volatile memory, then they are now ready to be transmitted using a wired or a wireless protocol, to a computer, and logged in a file such as .JSON or .csv or .dat or other format for post-processing. At the end of data collection 240, the test mode operation is disabled 245, and the regular firmware for normal operation of Biosensor is restored, per 250. If the raw biosensor measurements are saved in a non-volatile memory, then at the end of data collection 240, the test mode operation is disabled, per 245, and the regular firmware for normal operation of Biosensor is restored, per 250. Now using the regular firmware, the data samples are now ready to be transmitted using a wired or a wireless protocol, to a computer, and logged in a file such as .JSON or .csv or .dat or other format for post-processing.

FIG. 3 is a depiction of sample data from the biosensor screening test, in accordance with example embodiments described herein. In FIG. 3, typical voltage profiles measured in two biosensor samples are shown during biosensor screen test 200. Accordingly, applying baseline load current about 20 mA to the biosensor for about 2 seconds produces biosensor voltage output about 1300 mV and 1240 mV in two different biosensor samples. At the end of 2 seconds, the load current is increased to >80 mA as a single stimulus test for about 200 ms duration causing the voltage to decrease at 1170 mV and 1050 mV respectively with those two samples. Followed by the test stimulus, application of recovery load current about 20 mA (similar to baseline level) caused the biosensor voltage output to recover gradually close to respective baseline values. This particular test is illustrated as an example for simplicity, but in other test scenarios, the application of high load current may consist of series of one or more multiple stimuli and recovery sections such as a pulse train or dynamically adjusted load currents and durations.

Method 400 (FIG. 4) is a detailed depiction of Biosensor Data Outputs 115 and Determine Screening Test Score 120 processes of Biosensor screening system and method 100. Accordingly, the Biosensor screening test data outputs 405, as an example shown in FIGS. 3 and 300, is input to a conditional check 410 to determine whether biosensor screening test (110) is successfully complete. The method 400 automatically determines whether the test is successful and contain valid data for further processing. For example, the recorded time duration between start and end of the recorded samples or the total number of recorded samples may be used to determine whether the screening test is complete at 410.

When biosensor screening test 110 (method 200) is complete and the data collection 240 is successful as determined by 410, biosensor screening system and method 100 analyzes the data collected during the biosensor screening test and extract Data Attributes 415, perform Scaling of Data Attributes 420, input the scaled data attributes to the Screening Test Score Prediction 425 and output a biosensor Screening Test Score 430. When biosensor screening test 110 (method 200) is not complete and the data collection 240 is not fully successful for the entire test duration as determined by 410, then the Screening Test is output on a numerical and categorical value to reflect the functional integrity or level of risk for failure.

According to Process Biosensor Data Outputs 15 in method 100, the Data Attributes 415 in method 400 are quantified from the data collection 140 of biosensor measurements including biosensor battery voltage (shown in FIG. 3 below) during biosensor screening test 200 (or 10). According to certain examples described herein, various data attributes are extracted from the biosensor (e.g., biosensor 5) measurement during biosensor screening test 200 that include, but not are limited to: Average baseline voltage, Variance of baseline voltage, Rate of change of voltage during stimulus/stimuli, Minimal voltage during stimulus/stimuli, Maximal change in voltage due to stimulus/stimuli, Rate of change of voltage during post-stimulus/stimuli, Average recovery voltage and Variance of recovery voltage, and other statistical values related to baseline, stimulus/stimuli and recovery.

According to certain examples described herein, the extracted data attributes are scaled as in the step of 420 of method 400. Scaling allows standardization of the range of data attributes in either [0, 1] or [−1, 1]. In one example, the average and standard deviation of the data attributes are calculated with the training data set, and the data attributes are subtracted with the mean and divided by the standard deviation to have zero mean and unit variance according to the training population.

Figure 5:
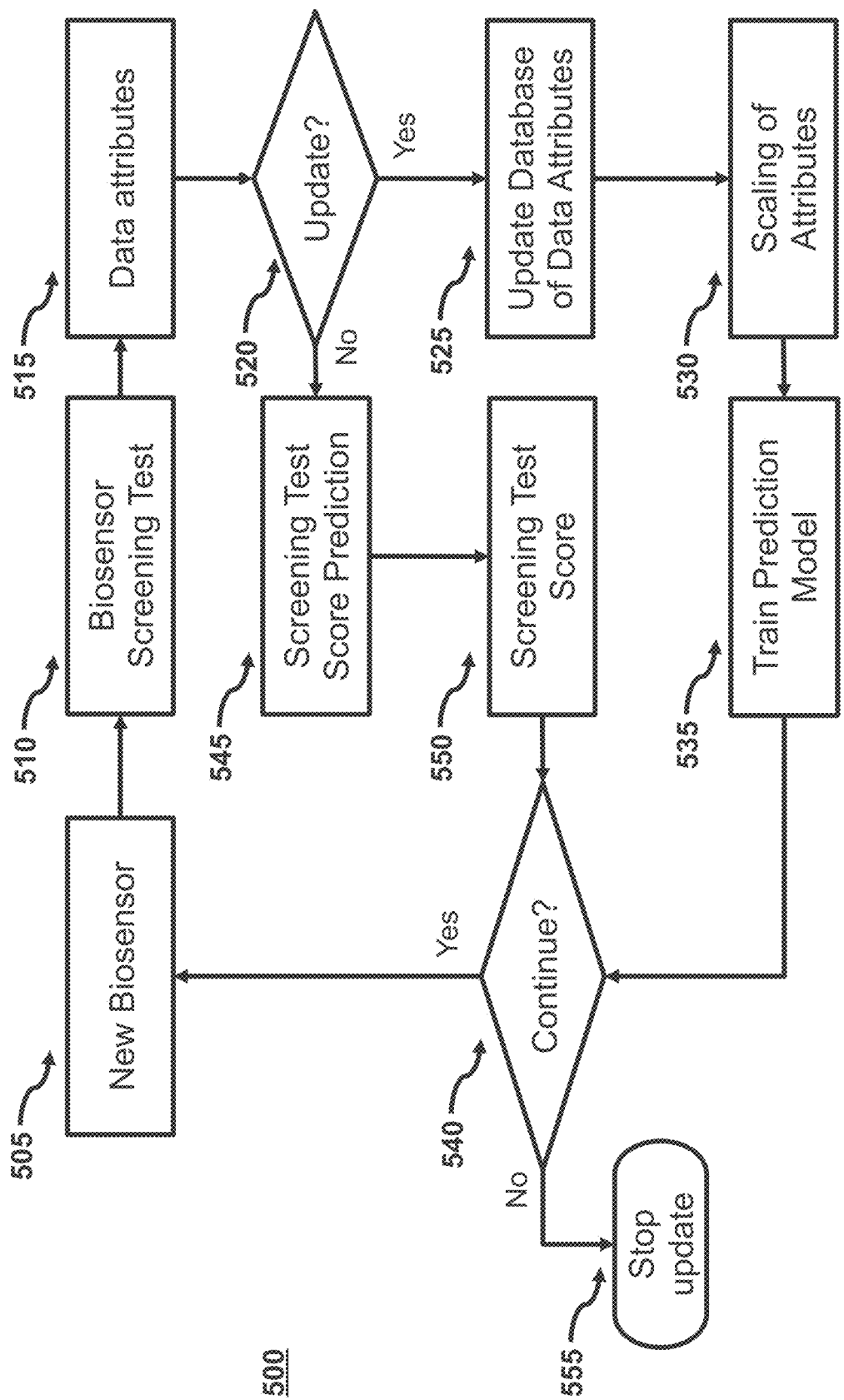
FIG. 5 is a depiction of an aspect of obtaining a prediction model for biosensor screening, in accordance with example embodiments described herein.

As described in further detail below, the scaled data attributes are input to assess the risk levels of functional deviation or failure of a biosensor by the Screening Test Score Prediction 425. In one example, the screening score prediction is performed by unsupervised learning method such as k-means clustering algorithm, in one example. Accordingly, the Screening Test Score Prediction first involves identifying a cluster group label among M cluster groups for the given sample of data attributes $x=\{x_1, x_2, \ldots, x_n\}$, where n is the number of attributes of a biosensor sample, by determining the cluster group label with a least sum of squared Euclidean distance $d_M(x, c_M)=\Sigma_j^n \|x_j-c_M\|^2$ between the data attributes x and the centroids of M cluster groups, $c=\{c_1, c_2, \ldots c_M\}$. The centroids of M cluster groups are determined beforehand using training m samples, $X=\{x^{(1)}, x^{(2)}, \ldots, x^{(m)}\}$, without any labels on the associated risk levels of functional deviation or failure in each sample $x^{(i)}$, using k-means clustering algorithm, in one example. More details on Training Prediction Model is described further in 500 (FIG. 5). The projection of one or more feature values of M centroids into a linear or nonlinear transformation including sigmoid, exponential and other functions constitutes the biosensor screening test score, $s=\{s_1, s_2, \ldots s_M\}$, where biosensor screening score can be numerical values such as a probability between 0 and 1 or 1→10 or 1→3 corresponding to categorical values such as high-risk/medium-risk/low-risk. In another example of transformation of determined M centroid feature values, the ascending sequence order of a principal feature such as the minimal voltage during stimuli/stimulus attribute values per the illustrated example can transform to the biosensor screening score, $s=\{s_1, s_2, \ldots s_M\}$. Thus, the cluster group with the least sum of squared Euclidean distance between with its cluster centroid and data attributes and the corresponding score is determined as Screenings Test Score, per 425. The determined Screening Test Score will be output at 430 as a Screening Test Score outcome.

According to one example described herein, biosensor Screening Test Score 430 operates as a scale to assess functional integrity of biosensor for field use. Moreover, lowest Screening Test Score 40 indicates low functional integrity according to certain examples described herein, and likewise, high screening test score indicates high functional integrity according to certain examples described herein. Furthermore, according to such example described herein, values of Screening Test Score 430 are on a numerical scale, such as 1→3 or 1→5 or 1→10. In other form of biosensor screening test score described herein, values of screening test score 40 are on categorical scale, such as low, medium, high as well reflecting to the functional integrity of the biosensor.

According to another example, the biosensor screening score may reflect to the level of risk for sensor functional deviation and or failure. In that case, the lower the biosensor screening score reflecting lower the risk level for failure during the sensor life, and higher the screening score reflecting higher the risk level of sensor failure. Furthermore, according to such example described herein, values of screening test score 40 are on a numerical scale, such as 1→3 or 1→5 or 1→10. In other form of biosensor screening test score described herein, values of screening test score 40 are on categorical scale, such as low, medium, high as well reflecting to the risk level of sensor failure.

Another example of Screening Test Score Prediction 425 step is an anomalous biosensor detection in which the test data attributes of a Biosensor are used to determine the multivariate Gaussian fit probability $$p(x; \mu, \Sigma) = \frac{1}{(2\pi)^{\frac{n}{2}} |\Sigma|^{\frac{1}{2}}} \exp\left(-\frac{1}{2}(x-\mu)^T \Sigma^{-1}(x-\mu)\right)$$

where x is the n-dimensional test data attributes $\{x_1, x_2, \ldots, x_n\}$, $\mu$ is the training sample mean, and $\Sigma$ is the training sample variance $x=\{x_1, x_2, \ldots, x_n\}$, and comparing p(x) value to an optimal epsilon ($\varepsilon$) value. If $p(x) < \varepsilon$, then the test Biosensor device is determined to be anomalous or indicating high probability of risk for failure corresponding to a Biosensor Screening Test Score of 1. On the other hand, if the determined probability p(x) is greater than or equal to an optimal epsilon ($\varepsilon$) value for the input test data attributes of a Biosensor, then the test Biosensor device is determined to be not anomalous or indicating low probability of risk for failure corresponding to a Biosensor Screening Test Score of 0. In this approach the Biosensor screening test score is a binary class value of 0 and 1, (i.e., $s \in \{0, 1\}$.

In other examples of Screening Test Score Prediction 425 involves inputting the test data attributes of the Biosensor to the supervised prediction model to output either test score class label or absolute score value using binary or multiclass classification modeling or linear/nonlinear univariate or multi-variate nonlinear regression modeling approaches, respectively.

The biosensor screening test score prediction model is trained with the training biosensor data attributes set by any of unsupervised and supervised learning methods including clustering, support vector machines, neural networks, linear or nonlinear regression models, binary or multi-label classification models or other machine learning approaches. Method 500 (FIG. 5) describes in detail on the processes of training of the prediction model and also adapted using the incoming new data. Accordingly, a New Biosensor 505 is subjected to a Biosensor Screening Test 510, generating Data Attributes 515 from the test output, as described previously in 415. The derived data attributes are input to a conditional check (Update?) 520 to determine whether these data attributes need to be updated with the database. If the output of 520 is yes, then the new Biosensor Data Attributes are input to the Update Database of Data Attributes 525 and appended to the training database of attributes and any associated label such as the biosensor sample is a good quality sample (s=1) or a failed sample in the field use (s=0) or a quality scale such as 1→5, determined based on the performance of the Biosensor in the field observations including biosensor operation life or battery life. Using the updated training database 525, the statistical metrics such as minimum, maximum, average, and standard deviation are calculated, and Scaling of Attributes 530 is carried out using the training data statistical measures. In one example, the data attributes are subtracted with their sample mean and divided by the sample standard deviation to have uniform scale with zero mean and unit variance among all the training data attributes. In another example, data attributes are subtracted with their respective either minimum or average values and divided by the respective range value (i.e., maximum-minimum) value.

The scaled training data attributes are used to train a Prediction Model 535 for determining Biosensor Screening Score. Obtaining a Prediction Model 535 is described more in detail in next section. Completion of training a Prediction Model takes to a next step of conditional check 540 that determines whether to continue with another New Biosensor or not for training or Biosensor Screening Prediction. If the answer to step 540 is "Yes", the processes described earlier from 505-540 is repeated. On the other hand, if the conditional check 540 output is "No", the update to the training database is stopped by Stop Update 555.

If the previous conditional check 520 output is "No", then the input Data Attributes are not used for updating the training database, but used as a test data to perform Screening test Score Prediction in step 545, and produce Screening Test Score 550. The steps 545 and 550 are exactly same as to that of steps 425 and 430.

In one example, Train Prediction Model 535 is the determination of M Biosensor clusters and Biosensor centroids out of the train data set using iterative refinement processes of data attribute assignment to the nearest centroid based on the squared Euclidean distance and centroid update by averaging all data attributes assigned with each centroid using k-means clustering algorithm. The iterations of assignment and centroid update continue until a stopping criterion such as no change in cluster data assignments, minimization of sum of squared Euclidean distances for all training data attributes, or completion of number of desired iterations.

Figure 6:
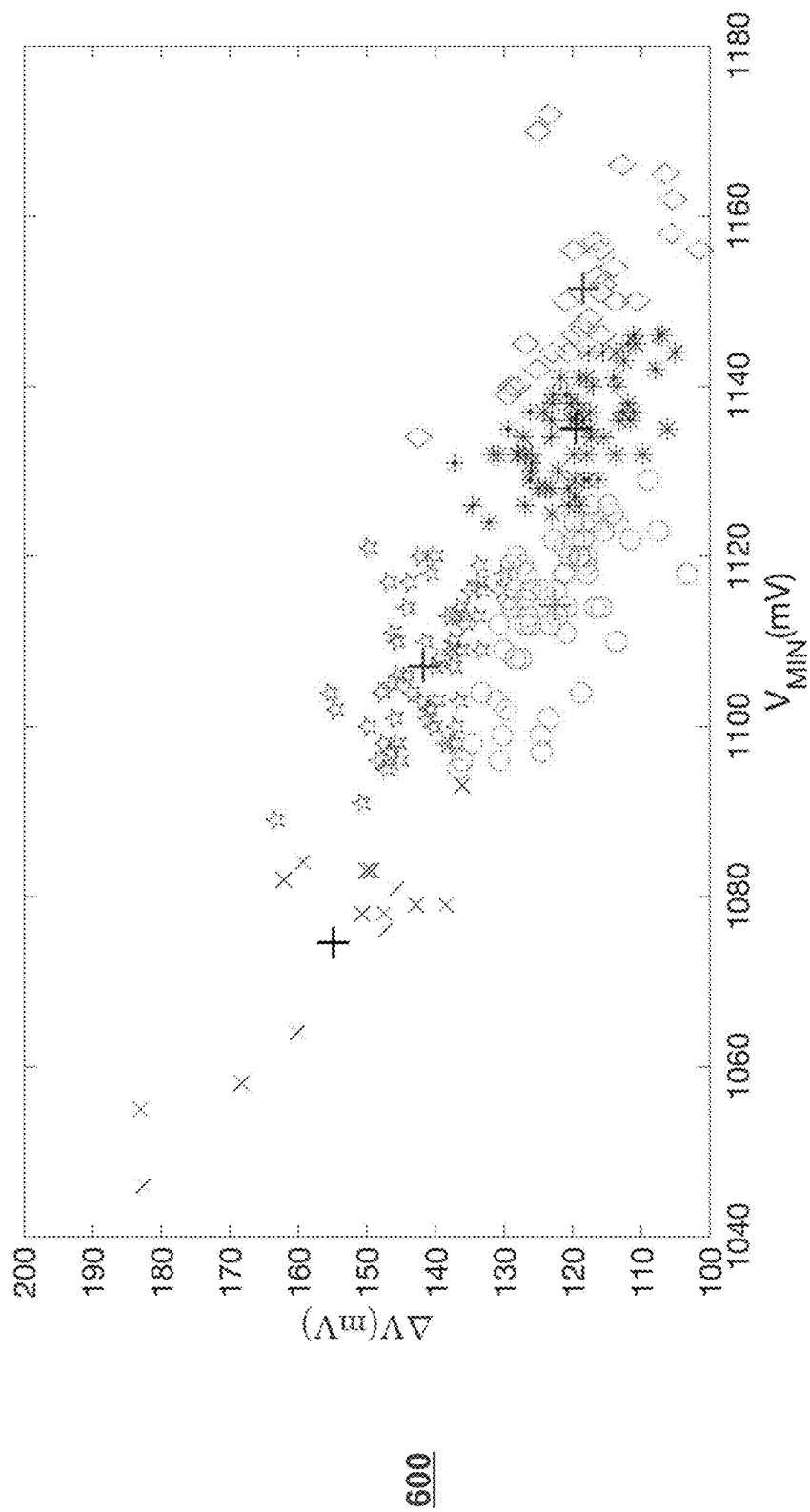
FIG. 6 is a depiction of a sample biosensor groups of different screening test scores, in accordance with example embodiments described herein.

FIG. 6 (600) is an example of scatter plot between 2 features Minimal voltage during stimulus/stimuli ($V_{MIN}$), Maximal change of voltage during post-stimulus/stimuli ($\Delta V$) of 5 clusters determined using training set of Biosensor data attributes of size (m×n) where m is the number of Biosensor samples (the current example of Biosensor population contains 231 samples) and n is the number of data attributes (10 independent data attributes in each biosensor sample example of FIG. 6). The plot is shown between only 2 dimensions of data attributes or features for visualization of the data and the cluster groups of Biosensor samples. Each cluster is differentiated with a unique marker, for example ◇, and the centroid of the cluster group is denoted with a marker of +. In this example, the Biosensor cluster centroids (M=5) may have corresponding values of Minimal voltage during stimulus/stimuli as $V_{MIN}{}^M=\{1.1071, 1.0746, 1.1350, 1.1515, 1.1142\}$ for the respective 5 cluster groups denoted with (★,×,*, ◇,○) in FIG. 6. In one example, the ascending sequence of Minimal voltage during stimuli/stimulus may correspond to Screening Test Score of s={2, 1,5,3,4} among 5 centroids. The Screening Test Score 1→5 may be referred to a scale where low screening score 1 may be referred to 'likely not good' and high screening score 5 may be referred to 'likely good'. Moreover, these scores can be referring to category/group labels such as high-risk, moderate-risk, medium-risk, low-risk, no-risk, for example.

In another example of Train Prediction Model 535 step is fitting a multivariate Gaussian distribution model for the given training Biosensor data attributes $X=\{x^{(1)}, x^{(2)}, \ldots, x^{(m)}\}$ determining the probability p(x) of not being failure samples as given in equation below.

$$p(x; \mu, \Sigma) = \frac{1}{(2\pi)^{\frac{n}{2}}|\Sigma|^{\frac{1}{2}}} \exp\left(-\frac{1}{2}(x-\mu)^T \Sigma^{-1}(x-\mu)\right);$$

$$\mu = \frac{1}{m}\sum_{i=1}^{m} x^{(i)};$$

$$\Sigma = \frac{1}{m}\sum_{i=1}^{m} (x^{(i)} - \mu)(x^{(i)} - \mu)^T$$

Where, x is the n-dimensional data attributes $\{x_1, x_2, \ldots, x_n\}$, $\mu$ is the training Biosensor sample mean, and $\Sigma$ is the training Biosensor variance.

Figure 7:
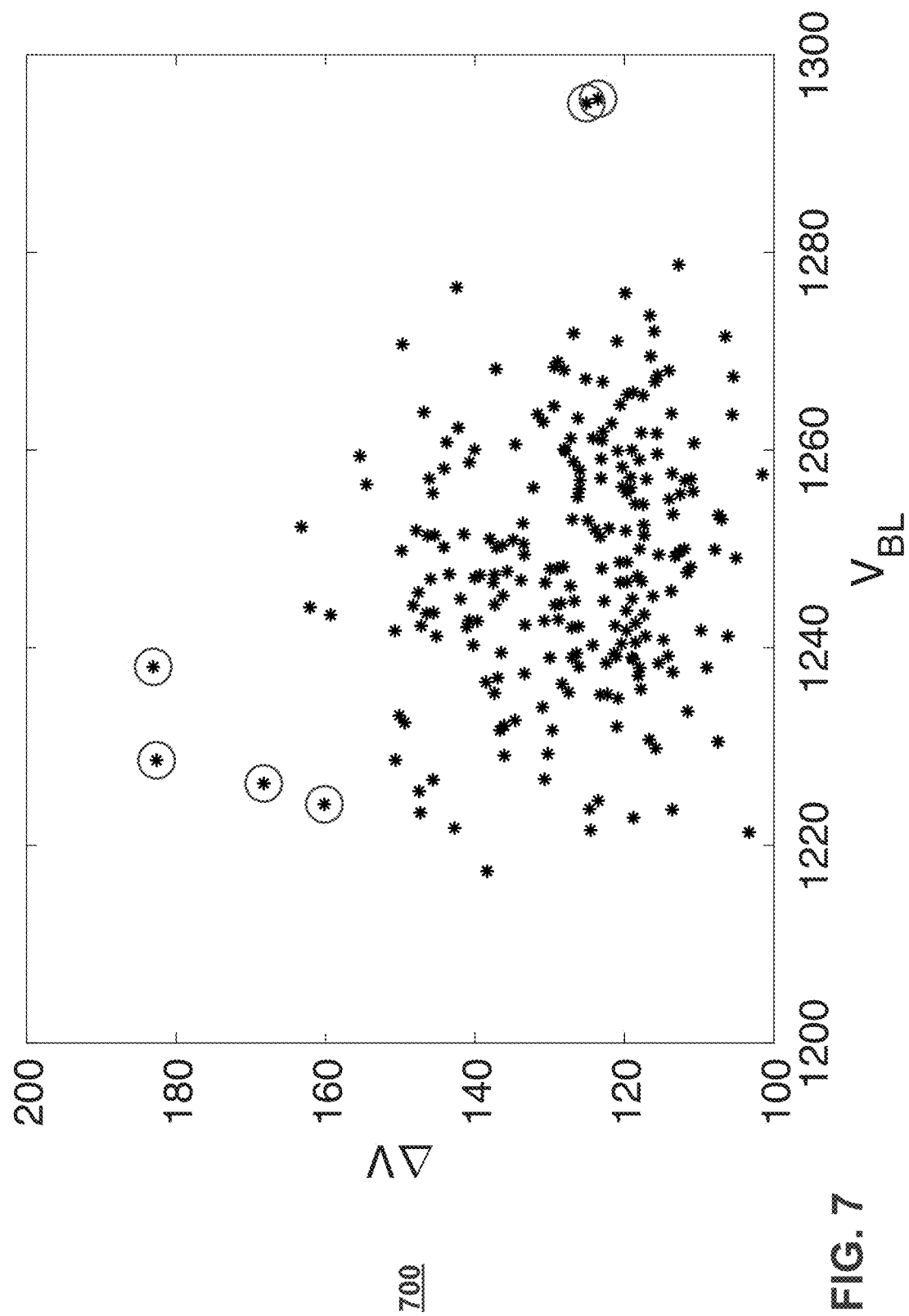
FIG. 7 is a depiction of a sample of biosensors identified as anomalous or non-anomalous biosensors using biosensor screening test, in accordance with example embodiments described herein.

FIG. 7 (700) is an example of scatter plot between 2 data attributes, Baseline voltage and Maximal change of voltage during post-stimulus/stimuli ($\Delta V$), extracted from output voltage profiles of Biosensors (n=231) subjected to Biosensor Screening Test. The plot is shown between only 2 dimensions of data attributes or features, and the anomalous biosensor samples detected using n-dimensional data attributes are circled out in this 2-D plot for visualization. The biosensor samples denoted with circled * may have a score of s=1 and the biosensor samples with only * and without circle may have a score of s=0 implying anomalous (high-risk for failure) vs non-anomalous (low-risk for failure) biosensor samples respectively.

In another example of Train Prediction Model 535 step is obtaining any of supervised univariate/bivariate/multivariate biosensor screening classification model or linear/non-linear biosensor screening classification model using a database of data attributes recorded from biosensor screening tests (via Biosensor Screening Test 200, FIG. 2) with two or more group/class labels identified from the observations of biosensor performance in field use. The reference group labels identified from field observations can be in one example, no-risk for device failure and risk for device failure. In another example, the group labels are high-risk, moderate-risk, medium-risk, low-risk, and no-risk. On the other hand, the biosensor groups predicted from unsupervised prediction model using the data attributes of training database can serve as the reference group/class labels for training of supervised classifier model. According to this semi-supervised learning arrangement, the overall prediction model may involve a tandem training of unsupervised prediction model followed by a supervised prediction model to output the biosensor class categories as screening test score.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A method for testing a biosensor, the method comprising:
connecting to a biosensor to a biosensor screening test apparatus;
conducting a biosensor screening test using the biosensor screening apparatus on the biosensor connected to the biosensor screening test apparatus;
collecting data outputs from the biosensor after completing the biosensor screening test;
processing the collected data outputs, wherein the processing the collected data outputs includes:
determining whether the biosensor screening test is complete;
determining data attributes from the data outputs of the biosensor screening test; and
scaling the determined data attributes; and
determining a screening test score.

2. The method of claim 1, wherein the biosensor screening test includes:
powering on the biosensor;
programming of test firmware;
initializing or rebooting the biosensor with the test firmware;
enabling a test mode operation of the test firmware;
applying a first average load current to the biosensor for a predetermined duration;
applying a test load current to the biosensor for a predetermined duration;
applying a second average load current to the biosensor for a predetermined duration;
disabling the test mode operation of the test firmware; and
restoring regular firmware for normal operation of the biosensor.

3. The method of claim 1, wherein the determined data attributes include: an average baseline voltage, a rate of change of voltage during at least one of a stimulus and stimuli of the biosensor screening test, minimum voltage during the biosensor screening test, maximal change in voltage during the biosensor screening test, rate of change of voltage during at least one of a post-stimulus and post-stimuli of the biosensor screening test, and average recovery voltage.

4. The method of claim 1, wherein the determining the screening test score includes applying a prediction model to the determined data attributes to determine the screening test score as a numerical or categorical value.

5. The method of claim 4, wherein the applying the prediction model includes training the prediction model using an updated database of determined data attributes, and the training the prediction model includes:
obtaining and updating a database of determined data attributes from the biosensor screening test;
scaling the determined data attributes for scaled data attributes;
training the prediction model using at least one of:
an unsupervised model to learn to predict two or more groups of biosensors including anomalous non-anomalous biosensor groups using the scaled data attributes of a training database;
a supervised classifier model to learn to predict two or more classes of biosensors using the scaled data attributes of the training database; and
a semi-supervised classifier model to learn to predict two or more classes of biosensors using the scaled data attributes of the training database.

6. The method of claim 5, wherein the obtaining and updating the database of determined data attributes for training of the prediction model includes:
conducting biosensor screening tests;
deploying the biosensors in field use and obtaining field observations from field use;

identifying data attributes of each biosensor with a group label according to the field observations; and creating a set of two or more unique groups biosensor data attributes per the group label.

7. The method of claim 1, wherein the screening testing score includes a predetermined set of numerical/categorical values.

8. The method of claim 1, further comprising outputting an intermediate biosensor screening test score if the biosensor screening test is determined to be not complete.

9. The method of claim 5, wherein the training the prediction model using the updated database of determined data attributes includes at least one of:

fitting a multivariate gaussian model to determine an anomalous biosensor group with failure risk from a normal biosensor group;

determining a clustering model that identifies a predetermined number of biosensor groups and respective centroids of biosensor cluster groups, and training a classifier model to predict the identified cluster group labels; and training a classifier model to predict biosensor group labels identified according to the field observations or group labels.

10. A computer-readable medium storing executable instructions that, upon execution, cause a digital computing processor to test a biosensor by performing functions comprising:

conducting a biosensor screening test using the biosensor screening apparatus on the biosensor connected to the biosensor screening test apparatus;

collecting data outputs from the biosensor after completing the biosensor screening test;

processing the collected data outputs;

determining a screening test score; and outputting an intermediate biosensor screening test score, wherein the intermediate biosensor screening test score includes a predetermined set of numerical/categorical values if the biosensor screening test is determined to be not complete.

11. The computer readable medium of claim 10, wherein the biosensor screening test includes:

powering on the biosensor;

programming of test firmware;

initializing or rebooting the biosensor with the test firmware;

enabling a test mode operation of the test firmware;

applying a first average load current to the biosensor for a predetermined duration;

applying a test load current to the biosensor for a predetermined duration;

applying a second average load current to the biosensor for a predetermined duration;

disabling the test mode operation of the test firmware; and restoring regular firmware for normal operation of the biosensor.

12. The computer-readable medium of claim 10, wherein the processing the collected data outputs includes:

determining whether the biosensor screening test is complete;

determining data attributes from the data outputs of the biosensor screening test; and scaling the determined data attributes.

13. The computer-readable medium of claim 12, wherein the determined data attributes includes: an average baseline voltage, a rate of change of voltage during at least one of a stimulus and stimuli of the biosensor screening test, minimum voltage during the biosensor screening test, maximal change in voltage during the biosensor screening test, rate of change of voltage during at least one of a post-stimulus and post-stimuli of the biosensor screening test, and average recovery voltage.

14. The computer-readable medium of claim 12, wherein the determining the screening test score includes applying a prediction model to the determined data attributes to determine the screening test score as a numerical or categorical value.

15. The computer-readable medium of claim 14, wherein the applying the prediction model includes training the prediction mode using an updated database, and the training the prediction model includes:

obtaining and updating a database of determined data attributes from the biosensor screening tests;

scaling the determined data attributes for scaled data attributes;

training the prediction model using at least one of:

an unsupervised model to learn to predict two or more groups of biosensors including anomalous non-anomalous biosensor groups using the scaled data attributes of a training database;

a supervised classifier model to learn to predict two or more classes of biosensors using the scaled data attributes of the training database; and a semi-supervised classifier model to learn to predict two or more classes of biosensors using the scaled data attributes of the training database.

16. The computer readable medium of claim 15, wherein the obtaining and updating the database of determined data attributes for training of prediction model includes:

conducting biosensor screening tests;

deploying the biosensors in field use and obtaining field observations from field use;

identifying data attributes of each biosensor with a group label according to the field observations; and creating a set of two or more unique groups biosensor data attributes per the group label.

17. The computer-readable medium of claim 15, wherein the training the prediction model using the updated database of determined data attributes includes at least one of:

fitting a multivariate gaussian model to determine an anomalous biosensor group with failure risk from a normal biosensor group;

determining a clustering model that identifies predetermined number of biosensor groups and respective centroids of biosensor cluster groups, and training a classifier model to predict the identified cluster group labels; and training a classifier model to predict biosensor group labels identified according to the field observations or group labels.

18. A biosensor screening test apparatus comprising:

a connector for connecting to a biosensor to the biosensor screening test apparatus;

a memory storing executable instructions;

a processor, coupled to the memory and executing the instructions stored on the memory, wherein upon execution, the stored instructions cause the processor to performing functions comprising:

conducting a biosensor screening test using the biosensor screening apparatus on the biosensor connected to the biosensor screening test apparatus;

collecting data attributes from the biosensor after completing the biosensor test;

scaling the collected data attributes; and
obtaining a screening test score;
wherein the biosensor screening test includes:
  powering on the biosensor;
  programming of test firmware;
  initializing or rebooting the biosensor with the test firmware;
  enabling a test mode operation of the test firmware;
  applying a first average load current to the biosensor for a predetermined duration;
  applying a test load current to the biosensor for a predetermined duration;
  applying a second average load current to the biosensor for a predetermined duration;
  disabling the test mode operation of the test firmware; and
  restoring regular firmware for normal operation of the biosensor.

* * * * *